(12) United States Patent
Kwon et al.

(10) Patent No.: US 10,556,340 B2
(45) Date of Patent: Feb. 11, 2020

(54) APPARATUS AND METHOD FOR CONTROLLING MOVING OBJECT, AND COMPUTER-READABLE RECORDING MEDIUM IN WHICH PROGRAM FOR IMPLEMENTING METHOD IN COMPUTER IS RECORDED

(71) Applicant: KOREA AEROSPACE RESEARCH INSTITUTE, Daejeon (KR)

(72) Inventors: Jae Wook Kwon, Daejeon (KR); Dong Hun Lee, Daejeon (KR); Hyo Choong Bang, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 207 days.

(21) Appl. No.: 15/535,299

(22) PCT Filed: Dec. 9, 2015

(86) PCT No.: PCT/KR2015/013421
§ 371 (c)(1),
(2) Date: Jun. 12, 2017

(87) PCT Pub. No.: WO2016/093607
PCT Pub. Date: Jun. 16, 2016

(65) Prior Publication Data
US 2017/0326730 A1  Nov. 16, 2017

(30) Foreign Application Priority Data

Dec. 12, 2014 (KR) .................. 10-2014-0179463
Dec. 8, 2015 (KR) .................. 10-2015-0174307

(51) Int. Cl.
*G06F 19/00* (2018.01)
*B25J 9/16* (2006.01)

(52) U.S. Cl.
CPC ........... *B25J 9/1664* (2013.01); *B25J 9/1653* (2013.01)

(58) Field of Classification Search
None
See application file for complete search history.

(56) References Cited

U.S. PATENT DOCUMENTS

| 5,875,993 A | * | 3/1999 | Weiss | G05D 1/107 244/3.15 |
| 6,154,691 A | * | 11/2000 | Bailey | B64G 1/286 244/165 |
| 6,860,451 B1 | * | 3/2005 | Wang | B64G 1/24 244/164 |

(Continued)

FOREIGN PATENT DOCUMENTS

| JP | 2002274499 A | 9/2002 |
| KR | 100765671 B1 | 10/2007 |

(Continued)

*Primary Examiner* — Bhavesh V Amin
(74) *Attorney, Agent, or Firm* — Blueshift IP, LLC; Robert Plotkin (57) ABSTRACT

According to an embodiment of the present invention, an apparatus for controlling a moving object includes a trajectory control unit configured to control a trajectory of the moving object and a position control unit configured to control a position of the moving object. Thus, it is possible to control an angle at which the moving object enters a target point.

11 Claims, 11 Drawing Sheets

(56) References Cited

U.S. PATENT DOCUMENTS

2007/0164167 A1* 7/2007 Bachelder .............. G05D 1/105
244/220
2017/0326730 A1* 11/2017 Kwon .................... B25J 9/1653

FOREIGN PATENT DOCUMENTS

| KR | 1020120069510 A | 6/2012 |
| KR | 1020120070291 A | 6/2012 |
| KR | 101456576 B1 | 10/2014 |

* cited by examiner

APPARATUS AND METHOD FOR CONTROLLING MOVING OBJECT, AND COMPUTER-READABLE RECORDING MEDIUM IN WHICH PROGRAM FOR IMPLEMENTING METHOD IN COMPUTER IS RECORDED

TECHNICAL FIELD

The present invention relates to a control of a moving object, and more particularly, an apparatus and method for controlling a trajectory so that a moving object arrives at a target point and a computer-readable recording medium having a program recorded therein for executing the method in a computer.

BACKGROUND ART

Along with the advance of technology associated with various moving objects such as an atmospheric aircraft, for example, unmanned reconnaissance aircraft, a drone, and a precision guided weapon, a spacecraft, for example, a satellite and a lunar lander, a soccer robot, and an unmanned submarine, there is a need for a technology for efficiently controlling a moving object.

In particular, it is necessary to accurately move a moving object from a start point to a target point. To this end, there is a need to move a moving object to a target point at a desired angle.

Although various trajectory guidance algorithms have been introduced to move a moving object to a target point, there is no technology to accurately enter the target point at a desired angle.

DETAILED DESCRIPTION OF THE INVENTION

Technical Problem

The present invention provides an apparatus and method for controlling a moving object by controlling a trajectory of the moving object and allowing the moving object to enter a target point at a desired angle.

Technical Solution

According to an embodiment of the present invention, there is provided an apparatus for controlling a moving object, the apparatus including a trajectory control unit configured to control a trajectory of the moving object and a position control unit configured to control a position of the moving object.

The trajectory control unit and the position control unit may use an error quaternion of the moving object to control the trajectory of the moving object and the position of the moving object, respectively.

The error quaternion of the moving object may be extracted from a quaternion indicating a trajectory of a current point of the moving object and a quaternion indicating a trajectory of a target point of the moving object.

The error quaternion $q_e$ of the moving object may be obtained by the following equation:

$$q_e = q_t^* \circ q$$

where $q_t$ is a target quaternion q, i.e., the trajectory of the target point, $q_t^*$ is a conjugate of the quaternion $q_t$, which indicates the trajectory of the target point, and q is the quaternion indicating the trajectory of the current point, and $\circ$ is multiplication of a preceding quaternion of $\circ$ and a following quaternion of $\circ$ and an operational expression of a vector and a scalar.

The trajectory of the moving object and position information including the trajectory may be expressed by the following equation:

$$\hat{q}_e = q_e + \varepsilon q_e'$$

where $\hat{q}_e$ is a dual quaternion and represents trajectory information $q_e$ of the moving object and position information $q_e'$ including the trajectory information of the moving object.

The position control unit may further use a difference between a position of the target point of the moving object and a position of the current point of the moving object to control the position of the moving object.

The position control unit may control the position of the moving object by the following equation:

$$q_e' = \tfrac{1}{2}(p_e \circ q_e)$$

where $p_e$ is the difference between the position $p_t$ of the target point of the moving object and the position p of the current point of the moving object, and $q_e'$ represents a position value including the trajectory information of the moving object.

The apparatus may further include an update unit configured to update the trajectory of the current point of the moving object and the position of the current point of the moving object.

The update unit may update the trajectory of the current point of the moving object and the position of the current point of the moving object by integrating a result of the following equation:

$$\dot{\hat{p}} = \tfrac{1}{2}\hat{q}_e \circ \hat{\omega}$$

where $\hat{\omega}$. $\hat{\omega}$ is a trajectory changing rate and a position changing rate over time of the moving object and the trajectory changing rate, that is, a curvature may be represented as $u_T$, which is a torque value that represents a rotational force, and the position changing rate may be represented as $u_F$, which is a force for controlling the position.

Figure 5:
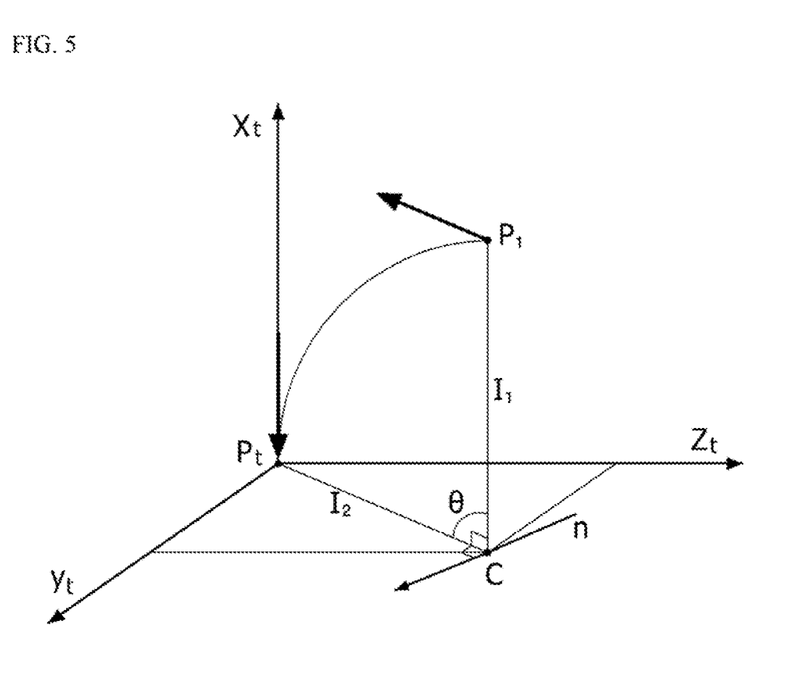
FIGS. 5 and 6 show examples for illustrating a principle by which a moving object moves from a start point to a target point.

A part for setting an entry angle at the target point of the moving object expresses a desired entry angle $\rho_t$ of Xt, Yt, and Zt of FIG. 5 as a value $[\rho_{x_t}, \rho_{y_t}, \rho_{z_t}]$. The value is input to a quaternion $q_t$ indicating a target trajectory of the moving object. According to an embodiment of the present invention, there is provided a method of controlling a moving object, the method including controlling a trajectory of the moving object and controlling a position of the moving object.

According to an embodiment of the present invention, there is provided a computer-readable recording medium having a program for executing a method of controlling a moving object stored therein, the method including controlling a trajectory of the moving object and controlling a position of the moving object.

Advantageous Effects of the Invention

According to an embodiment of the present invention, it is possible for a moving object to accurately move from a start point to a target point. In particular, according to an embodiment of the present invention, it is possible to accurately control an entry angle when a moving object reaches a target point by controlling a trajectory of the moving object.

MODE OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Although the terms "first," "second," etc. may be used herein to describe various elements, these elements should not be limited by these terms. These terms are only used to distinguish one element from another. For example, a first element could be termed a second element, and similarly, a second element could be termed a first element, without departing from the scope of the present invention. The term "and/or" includes any and all combinations of one or more of associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "the" are intended to include the plural forms as well unless the context clearly indicates otherwise. It will be further understood that the terms "comprises," "comprising," "includes," "including," and/or "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings. In the figures, the same reference numerals are used to denote the same elements throughout the drawings and redundant descriptions thereof will be omitted.

An apparatus and method for controlling a moving object according to an embodiment of the present invention controls a trajectory and a position of a moving object using a dual quaternion to enter a desired target point at a desired angle.

A dual quaternion is formed by expanding a quaternion, which is calculated in a linear differential equation, to a dual number system, in which rotary motion and translational motion are handled at the same time. By using a dual quaternion, it is possible to simultaneously express attitude and a position in a three-dimensional space and represent a single state variable with eight values.

Thus, a dual quaternion has advantages in terms of compactness, no singularity, and low computational complexity.

Figure 1:
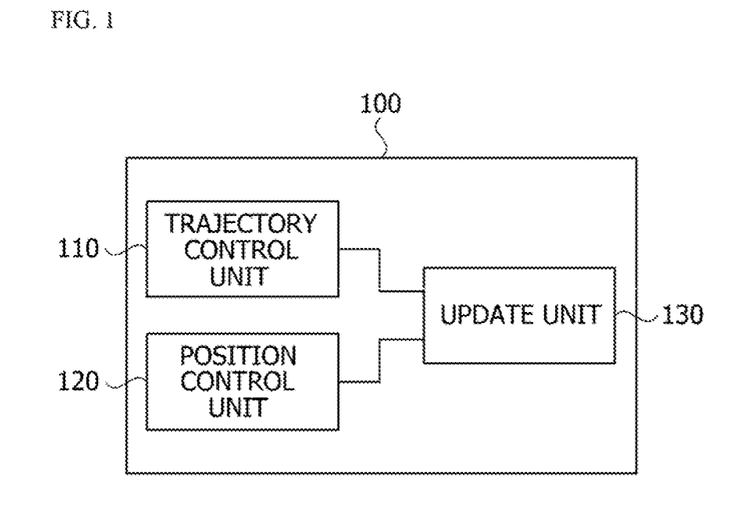
FIG. 1 is a block diagram of an apparatus for controlling a moving object according to an embodiment of the present invention.
Figure 2:
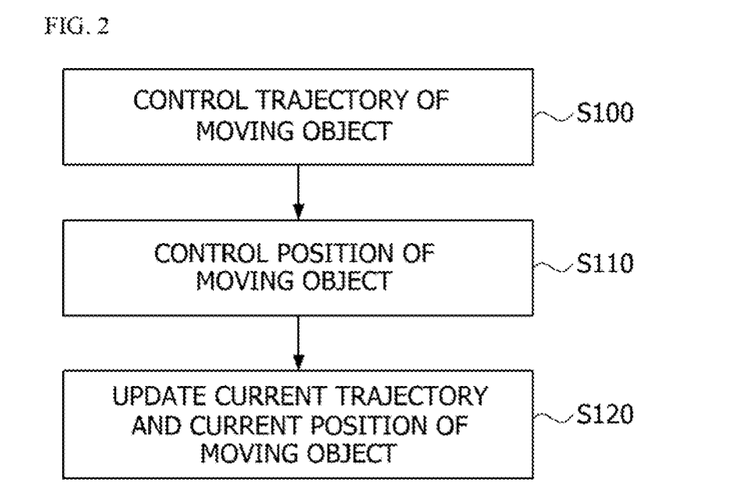
FIG. 2 is a flowchart showing a method of controlling a moving object of an apparatus for controlling a moving object according to an embodiment of the present invention.

FIG. 1 is a block diagram of an apparatus for controlling a moving object according to an embodiment of the present invention, and FIG. 2 is a flowchart showing a method of controlling a moving object of an apparatus for controlling a moving object according to an embodiment of the present invention.

Referring to FIG. 1, an apparatus 100 for controlling a moving object includes a trajectory control unit 110, a position control unit 120, and an update unit 130.

Referring to FIGS. 1 and 2, the trajectory control unit 1120 controls a trajectory of a moving object (S100), and the position control unit 120 controls a position of the moving object (S110). Thus, an angle at which a moving object enters a target point may be controlled.

Here, the trajectory control unit 110 and the position control unit 120 may use an error quaternion of the moving object to control the trajectory and position of the moving object, respectively. Here, a trajectory refers to a path along which a moving object moves, that is, a curved shape formed by the movement of a moving object. There are an unlimited number of trajectories along a moving object may move from a start point to a target point, and an angle at which the moving object enters the target point may be adjusted depending on the trajectory of the moving object.

Here, the error quaternion of the moving object may be extracted from a quaternion of a current position of the moving object and a quaternion of a target point of the moving object.

The error quaternion $q_e$ of the moving object may be obtained by the following Equation:

$$q_e = q_t^* \circ q$$

where $q_t^*$ is a conjugate of the quaternion $q_t$ that represents the trajectory of the target point, and q is the quaternion that represents the trajectory of the current point. Here, the trajectory of the target point refers to an instantaneous trajectory of the target point, and the trajectory of the current point refers to an instantaneous trajectory of the current point.

Also, the position control unit 120 may further use a difference between a position of the target point of the moving object and a position of the current point of the moving object to control the position of the moving object.

That is, the position control unit 120 may control the position of the moving object by using the following equation:

$$q_e' = \tfrac{1}{2}(p_e \circ q_e)$$

where $p_e$ is the difference between the position $p_t$ of the target point of the moving object and the position p of the current point of the moving object.

The update unit 130 updates the trajectory of the current point of the moving object and the position of the current point of the moving object (S120). In this case, the update unit 130 may use quaternion kinematics to update the trajectory of the current point of the moving object and the position of the current point of the moving object. That is, the update unit 130 may update the trajectory of the current point of the moving object and the position of the current point of the moving object by integrating a result of the following equation:

$$\hat{\dot{p}} = \tfrac{1}{2} \hat{q}_e \circ \hat{\omega}$$

where $\hat{\omega} = [u_T:0] + \varepsilon[u_F:0]$, $\hat{q}_e = q_e + \varepsilon q_e'$, $u_T$ is a torque for controlling the trajectory of the moving object, and $u_F$ is a force for controlling the position of the moving object.

The concept of a dual quaternion will be briefly described before the apparatus and method for controlling a moving object according to an embodiment of the present invention are described in detail.

A dual quaternion will be expressed as the following equation:

$$\hat{q} = q + \varepsilon q'$$

where $\hat{q}$ is a dual quaternion, q is a real part of the dual quaternion, q' is a dual part of the dual quaternion, and c is a separator for separating the real part and the dual part of the dual quaternion from each other $\varepsilon^2 = 0$ and $\varepsilon \neq 0$.

According to an embodiment of the present invention, the dual quaternion $\hat{q}$ may be expressed using q, which represents an angle of the trajectory of the moving object, and q', which represents the position of the moving object. Here, q' may be derived from q, and specifically, may be derived as the following equation:

$$q' = \tfrac{1}{2}(p \circ q)$$

where ○ indicates multiplication. $q_1 \circ q_2$ may be represented as $q_{s1} q_{v2} + q_{s2} q_{v1} + q_{v1} \times q_{v2}, q_s q_{s2} - q_{v1} q_{v2}$ when a quaternion $q_1$ has a scalar value $q_{s1}$ and a vector value $q_{v1}$ and a quaternion $q_2$ has a scalar value $q_{s2}$ and a vector value $q_{v2}$.

Figure 3:
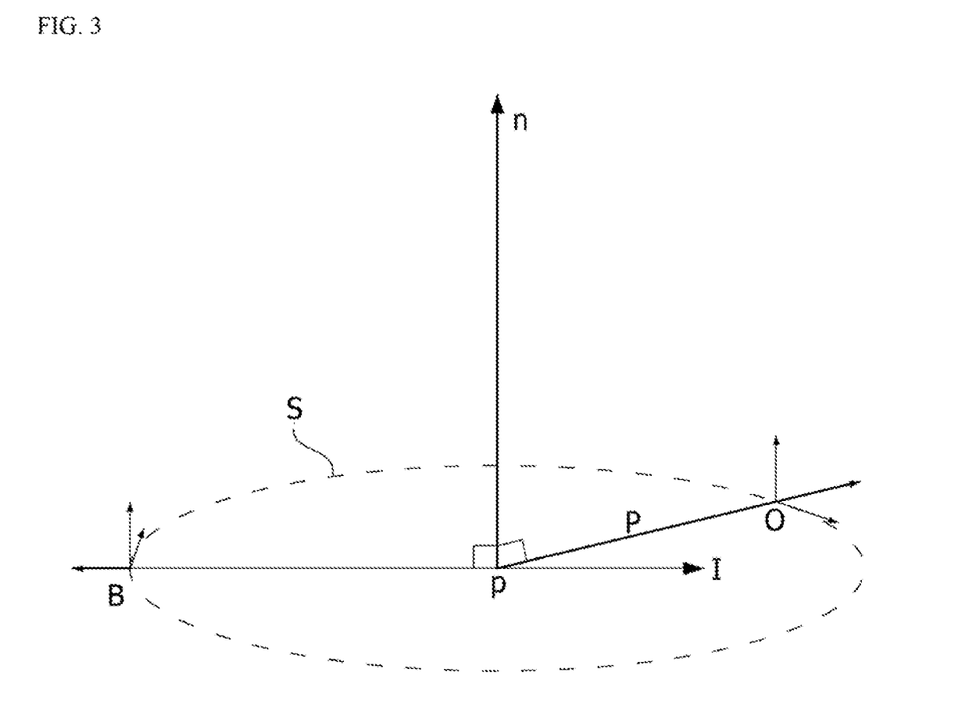
FIGS. 3 and 4 illustrate a dual quaternion using Plücker coordinates.

Such a dual quaternion may be described in further detail by using the Plücker coordinates of FIG. 3.

Referring to FIG. 3, when a coordinate O is positioned on a vector passing through a point P, a coordinate B is positioned on a vector I passing through the point P, a moving object moves from a start point, that is, the coordinate O having a predetermined position and attitude on the space, to a target point, that is, the coordinate B having another determined position and attitude, the moving object may rotate with respect to a vector n, which is a moment vector passing through the point P. That is, the moving object may rotate along a circular arc to move to the target point at the target attitude. In detail, when two coordinates, that is, the coordinate B and the coordinate O are present as Plücker coordinates, and the vector I passing through the central point P is expressed in additional consideration of a rotation component, the vector I may be expressed as p×l. The vector I may be expressed as $\hat{l} = l + \varepsilon(p \times l) = l + \varepsilon n$ by using dual numbers.

Figure 4:
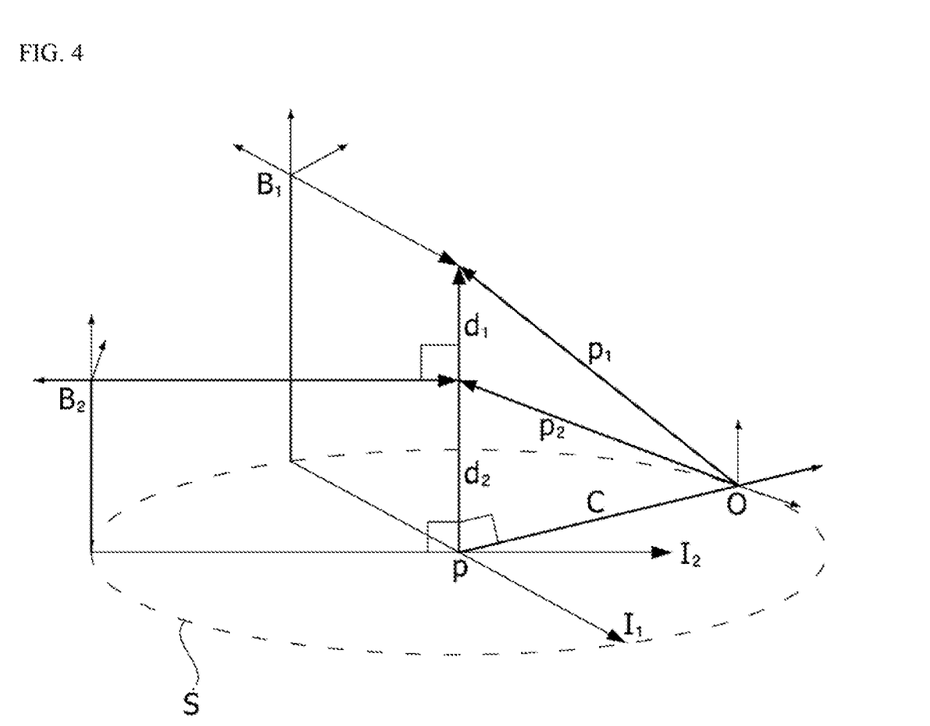

Such a principle may be applied to a three-dimensional space, as shown in FIG. 4 and the following equations:

$$\hat{l}_1 = l_1 + \varepsilon(p_1 \times l_1)$$

$$\hat{l}_2 = l_2 + \varepsilon(p_2 \times l_2)$$

Dual Angle $$\hat{\theta} = \theta + \varepsilon d\hat{n} = n + \varepsilon(c \times n)$$

$$\hat{l}_1 \cdot \hat{l}_2 = \cos \hat{\theta}$$

$$\hat{l}_1 \cdot \hat{l}_2 = \sin \hat{\theta} \hat{n}$$

A method of controlling a moving object using a dual quaternion according to an embodiment of the present invention will be described below in further detail.

Figure 6:
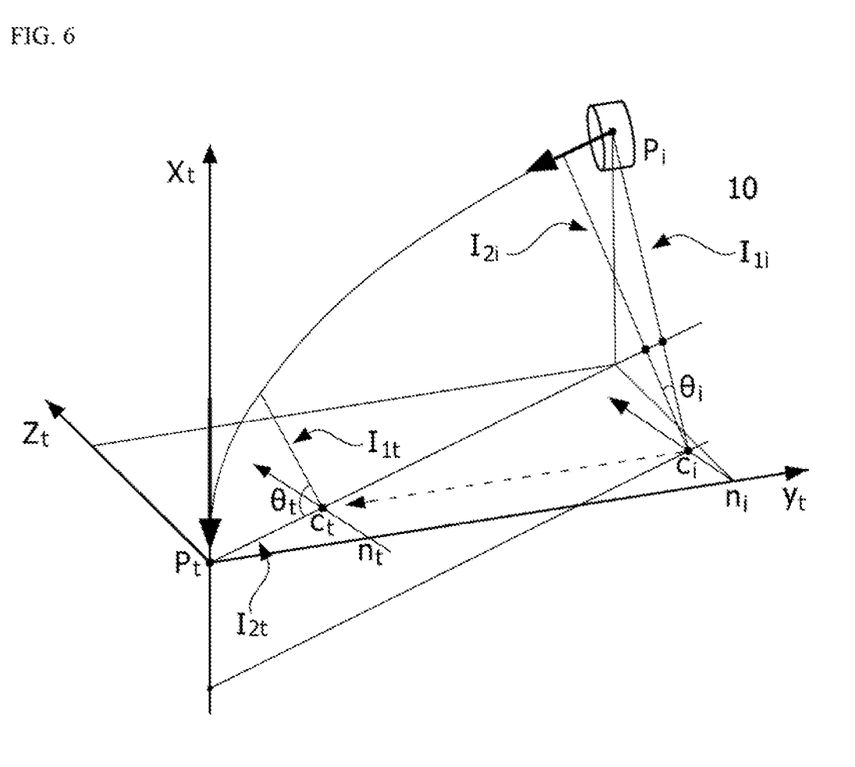

FIG. 5 shows an example for illustrating a principle by which a moving object moves from a start point $P_i$ to a target point $P_t$, and FIG. 6 shows another example for illustrating a principle by which a moving object moves from a start point $P_i$ to a target point $P_t$.

Referring to FIGS. 5 and 6, when a moving object is intended to move from the start point $P_i$ to the target point $P_t$, a trajectory formed to start in parallel with a plane yz at the start point $P_i$ and to vertically enter the plane yz at the target point $P_t$ is illustrated as an example.

FIG. 5 shows that $I_1$ has the same length as $I_2$, that is, an altitude of the start point of the moving object and a distance of the target point of the moving object are the same with respect to a point C, as an example.

The point C, which is a central point through which the vector n, which is a rotational axis, passes, serves as a center of a circle, a moving object starts and arrives as an arrow from $P_i$, which is the start point, to $P_t$, which is the destination point, and θ is 90 degrees.

FIG. 6 shows an example of vertically rotating and applying the principles of FIGS. 1 and 5 and illustrates an example in which an altitude of the start point of the moving object and a distance of the target part of the moving object are different, with respect to a point $C_i$ on the plane yz.

From FIG. 6, it is possible to find a quaternion $q_i$ at $P_i$, which is the start point, for forming the trajectory of $P_i$ to a desired curvature. When $q_i$ is regarded as a quaternion value representing the angle of the trajectory of the moving object at $P_i$, a dual quaternion may be expressed in additional consideration of its position by using the following equation:

$$\hat{q}_i = q_i + \varepsilon q_i' = q_i + \varepsilon \tfrac{1}{2}(p_i \circ q_i)$$

Similarly, $q_t$ at the target point $P_t$ may also be found and may be expressed by the following equation:

$$\hat{q}_t = q_t + \varepsilon q_t' = q_t + \varepsilon \tfrac{1}{2}(p_t \circ q_t)$$

According to an embodiment of the present invention, the trajectory control unit 110 may use an error quaternion of a moving object to control a trajectory of the moving object. The effort quaternion of the moving object may be extracted through a difference between a quaternion of a current point of the moving object, i.e., q and a quaternion of a target point of the moving object, i.e., $q_t$. Here, the quaternion of the current point of the moving object may be a quaternion of a start point of the moving object when the moving object has not yet moved and may be a quaternion of a point at which the moving object is currently positioned when the moving object is moving.

That is, $q_e = q_t^* \circ q$, $q_t^*$ is a conjugate of the quaternion $q_t$ of the target point, and q is the quaternion of the current point.

The trajectory control unit 110 may extract $u_T$ using the error quaternion $q_e$. That is, $u_T$ may be extracted as $u_T = -K_1 q_e$, $K_1$ is a gain, and $u_T$ is a torque for controlling the trajectory of the moving object. $u_T$ may represent a curved shape of the trajectory of the moving object. This serves to form a curved shape while moving the point C that has an angle $\theta_t$ and is a rotational center point through which the vector n of FIG. 6 passes.

Also, the position control unit 120 may use a dual part $q_e'$ of an error dual quaternion to control the position of the moving object. As described above, a dual quaternion of the quaternion q of the current point and a dual quaternion of the quaternion $q_t$ of the target point are found as $\hat{q}$ and $\hat{q}_t$, respectively, and an error dual quaternion is found as $\hat{q}_e = \hat{q}_t^* \circ \hat{q}$ from the dual quaternions. The error dual quaternion may be expressed as $\hat{q}_e = q_e + \varepsilon q_e'$ and may be extracted using $q_e' = \frac{1}{2}(p_e \circ q_e)$. Here, $P_e$ is a difference between the position $P_t$ of the target point of the moving object and the position P of the current point of the moving object, that is, $P_e = P_t - P$.

The position control unit 120 may extract $u_F$ using the dual part $q_e'$ of the error dual quaternion. That is, $u_F$ may be extracted as $u_F = K_2 q_e'$, $K_2$ is a gain, and $u_F$ is a control force.

Since the moving object moves from the start point to the target point, the quaternion of the moving object continues to change. Thus, the update unit 130 updates the trajectory of the current point of the moving object and the position of the current point of the moving object. When the update unit 130 extracts the trajectory of the current point of the moving object and the position of the current point of the moving object, the trajectory control unit 110 and the position control unit 120 may control the trajectory and position of the moving object by using a result value of the update unit 130 as the trajectory and position of the current point of the moving object.

To this end, the update unit 130 may use quaternion kinematics. That is, the update unit 130 may update the trajectory and position of the current point of the moving object by using the following equation:

$$\dot{\hat{p}} = \frac{1}{2} \hat{q}_e \circ \hat{\omega}$$

where $\hat{\omega} = [u_T:0] + [u_F:0]$, $\hat{q}_e = q_e + \varepsilon q_e'$, $u_T$ is a torque for controlling the trajectory of the moving object, and $u_F$ is a force for controlling the position of the moving object.

A result value $\dot{\hat{P}}$ of the above equation represents an instantaneous rate of change of the dual quaternion of the moving object. Thus, when $\dot{\hat{P}}$ is integrated, an angle and a position of the current point of the moving object may be calculated. FIGS. 7 to 12 show a simulation result obtained by applying a method of controlling a moving object according to an embodiment of the present invention.

Figure 7:
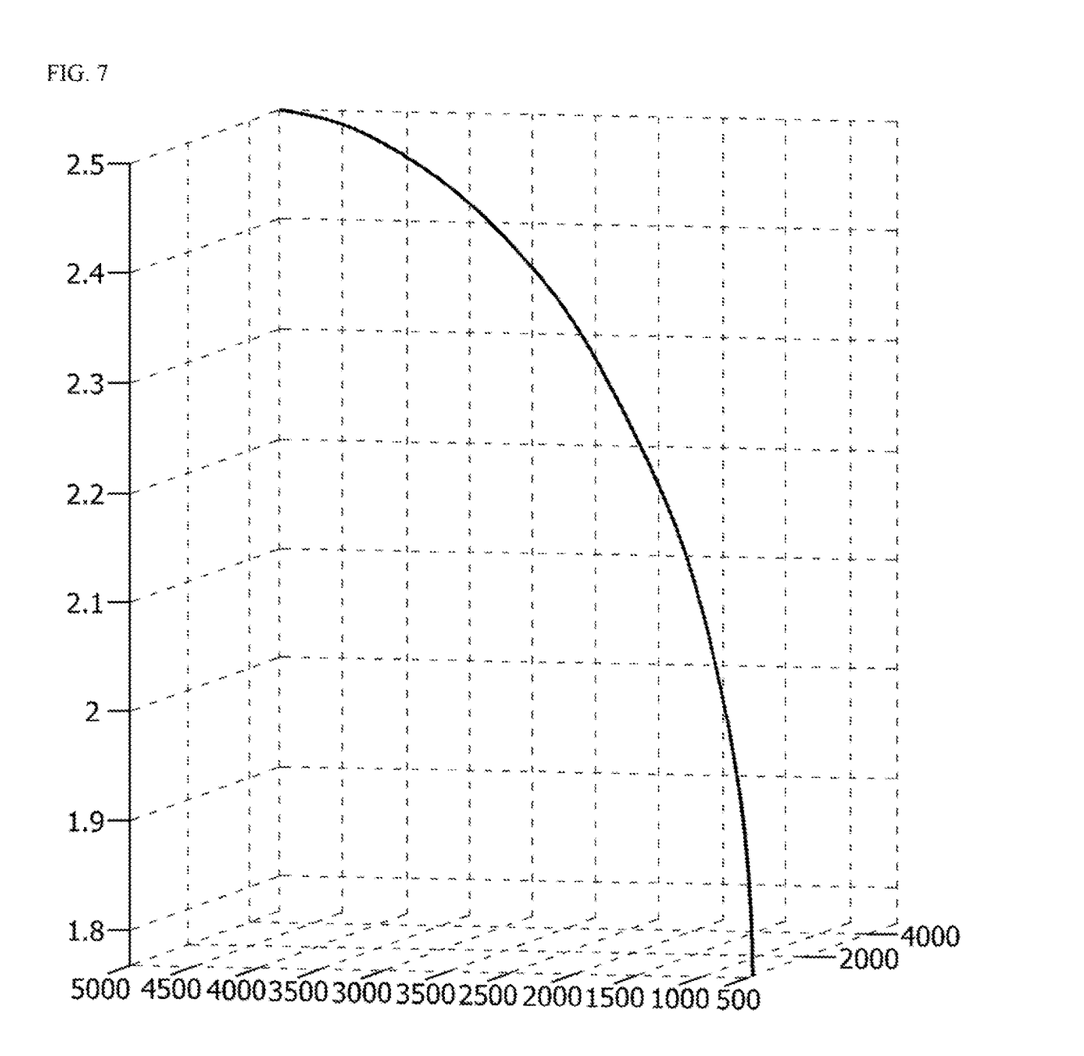
FIGS. 7 to 12 show a simulation result obtained by applying a method of controlling a moving object and a method of entering a moving object at a desired angle according to an embodiment of the present invention.
Figure 8:
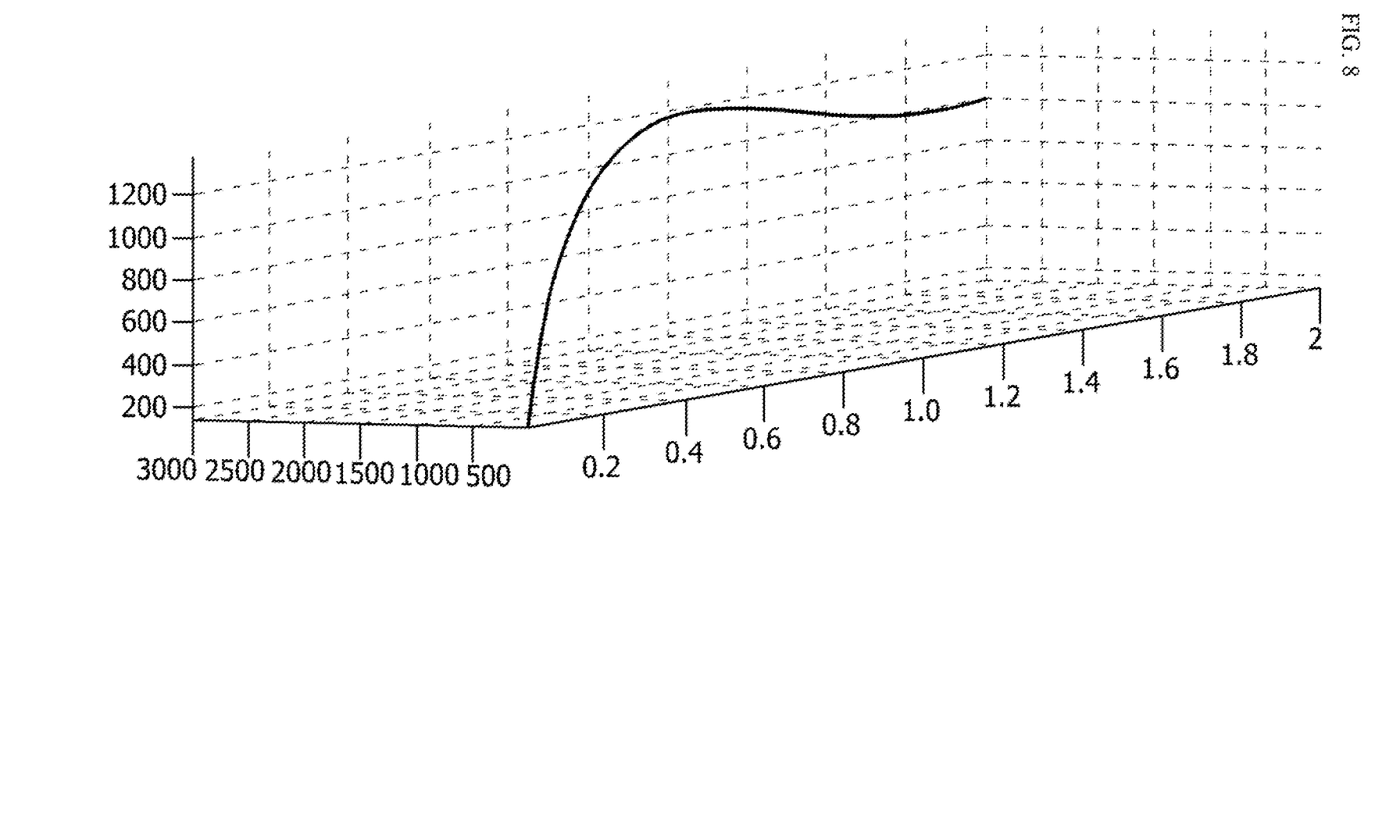

Referring to FIGS. 7 and 8, a situation in which a moving object starts in parallel with a ground surface at a start point and reaches the ground surface at the target point in a vertical direction (90 degrees) is simulated. It can be seen that the target point is reached at a desired angle when an altitude is shorter than a distance as shown in FIG. 8 as well as when the altitude is longer than the distance as shown in FIG. 7.

Figure 9:
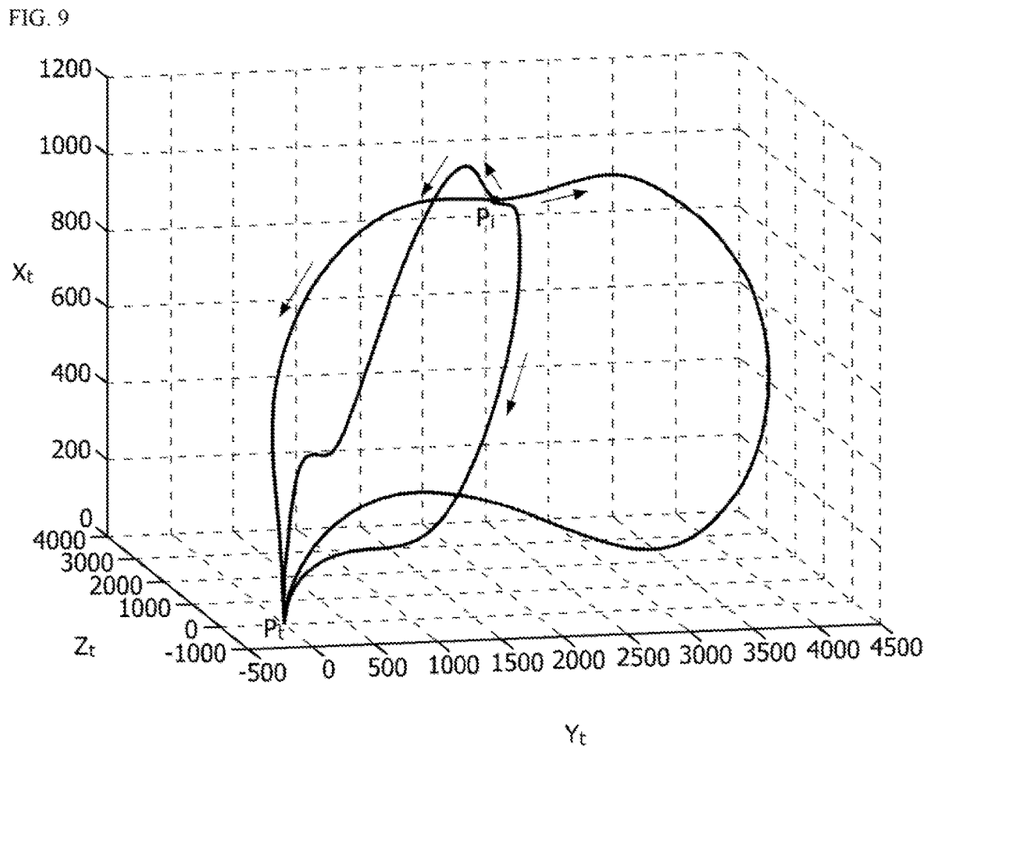

FIG. 9 shows that four moving objects that start at different initial speeds in different directions may reach the same target point at the same entry angle.

Figure 10:
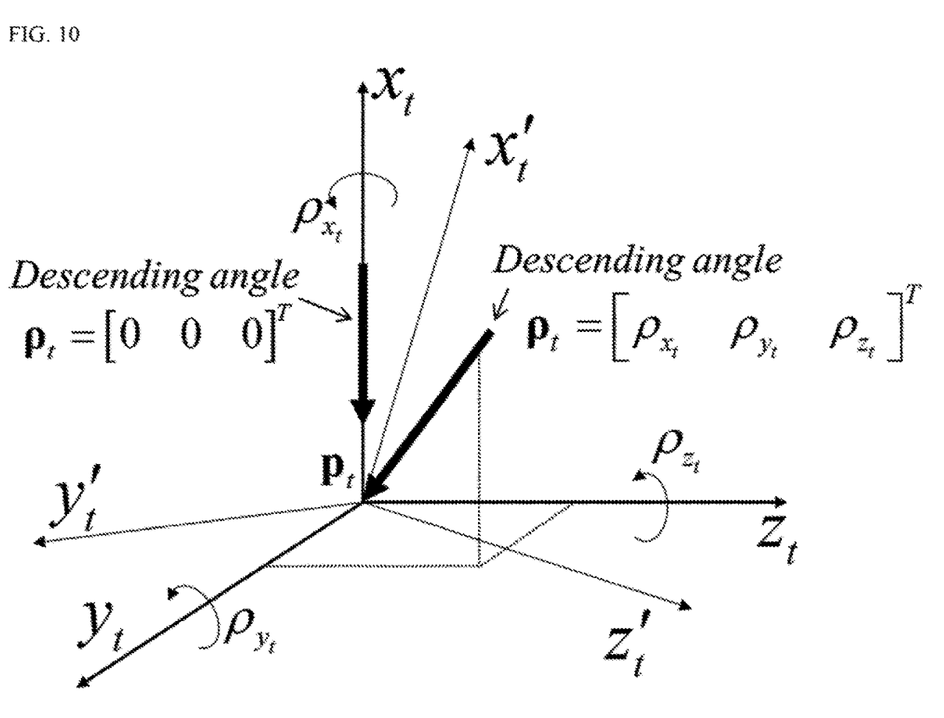

FIG. 10 shows coordinates that are transformed to set a desired entry angle other than a vertical descending angle with respect to the same target point.

Figure 11:
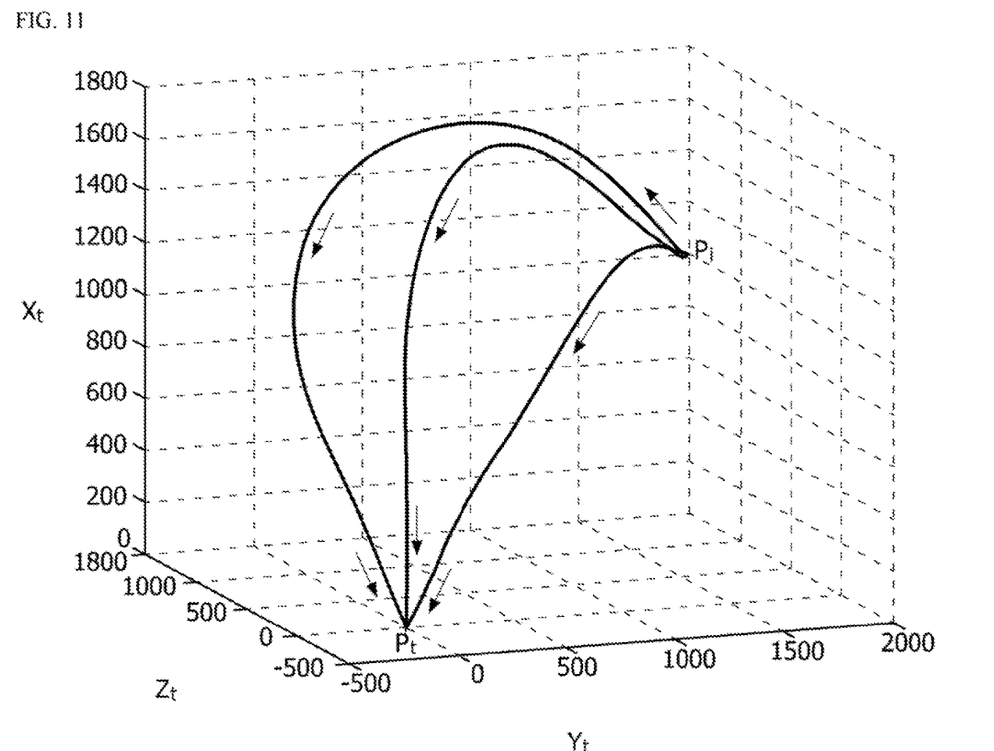
Figure 12:
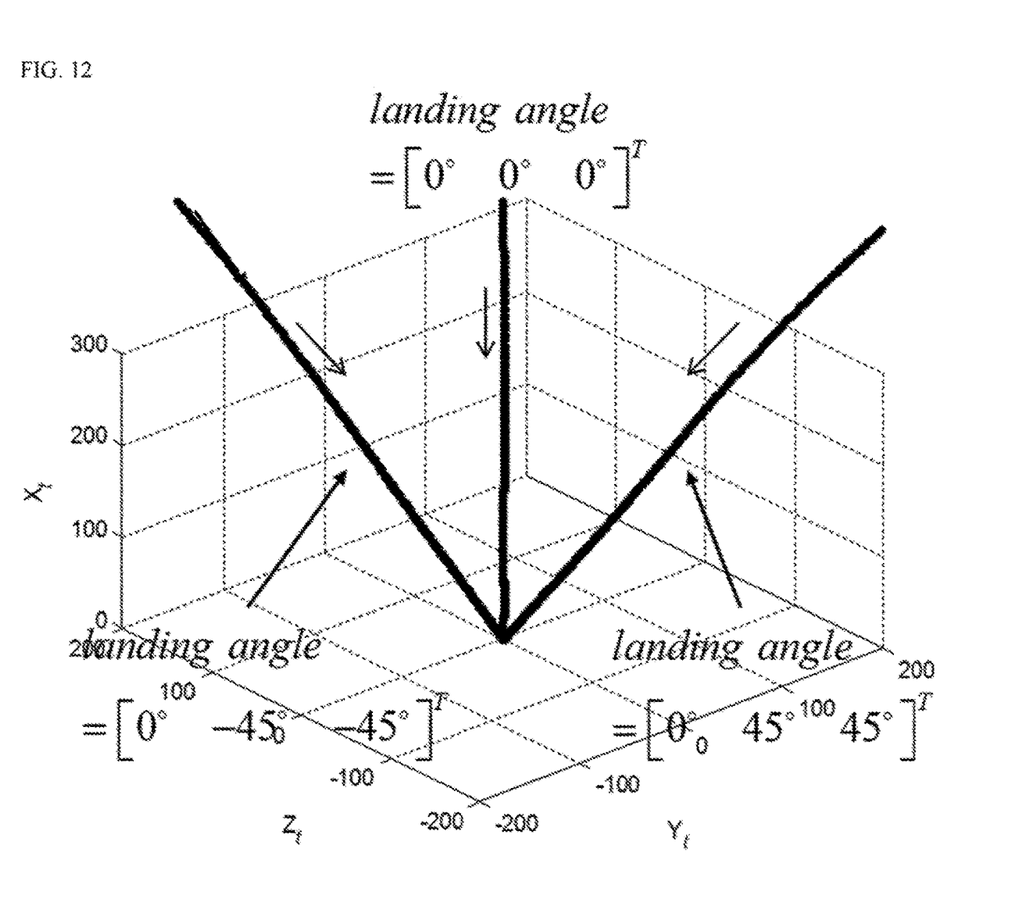

FIGS. 11 and 12 show that a moving object may start at the same start point and reach the same target point at three angles. Also, it can be seen that the moving object may enter the target point at a desired angle.

As described above, according to an embodiment of the present invention, the moving object may control a trajectory when the target point is reached. The method and apparatus according to an embodiment of the present invention may be applied to a soccer robot, an unmanned submarine, etc., as well as a missile and a lunar lander.

The exemplary embodiment of the present invention is not only implemented by an apparatus and a method, but also can be implemented through a program for realizing functions corresponding to the configuration of the exemplary embodiment of the present invention or a recording medium having the program recorded thereon.

While the present invention has been described with reference to exemplary embodiments, it will be understood by those of ordinary skill in the art that variations and modifications of the invention may be made without departing from the spirit and scope of the invention as defined by the appended claims.

The invention claimed is:

1. An apparatus for controlling a moving object, the apparatus comprising:
   a trajectory control unit configured to control a trajectory of the moving object; and
   a position control unit configured to control a position of the moving object,
   wherein the trajectory control unit and the position control unit use an error quaternion of the moving object to control the trajectory of the moving object and the position of the moving object, respectively,
   wherein the error quaternion of the moving object is extracted from a quaternion indicating a trajectory of a current point of the moving object and a quaternion indicating a trajectory of a target point of the moving object, and
   wherein the error quaternion ($q_e$) of the moving object is obtained by the following equation:

$$\hat{q}_e = \hat{q}_t^* \circ \hat{q}$$

where $q_t^*$ is a conjugate of the quaternion ($q_t$) indicating the trajectory of the target point and q is the quaternion indicating the trajectory of the current point.

2. The apparatus of claim 1, wherein the position control unit further uses a difference between a position of the target point of the moving object and a position of the current point of the moving object to control the position of the moving object.

3. The apparatus of claim 2, wherein the position control unit controls the position of the moving object by the following equation:

$$q_e' = \frac{1}{2}(p_e \circ q_e)$$

where $p_e$ is the difference between the position ($p_t$) of the target point of the moving object and the position (p) of the current point of the moving object.

4. The apparatus of claim 3, further comprising an update unit configured to update the trajectory of the current point of the moving object and the position of the current point of the moving object.

5. The apparatus of claim 4, wherein the update unit updates the trajectory of the current point of the moving object and the position of the current point of the moving object by integrating a result of the following equation:

$$\dot{\hat{p}} = \frac{1}{2} \hat{q}_e \circ \hat{\omega}$$

where $\hat{\omega} = [u_T:0] + [u_F:0]$, $\hat{q}_e = q_e + \varepsilon q_e'$, $u_T$ is a torque for controlling the trajectory of the moving object, and $u_F$ is a force for controlling the position of the moving object.

6. A method of controlling a moving object, the method comprising: controlling a trajectory of the moving object; and controlling a position of the moving object,
   wherein the controlling of a trajectory of the moving object and the controlling of a position of the moving object comprise using an error quaternion of the moving object to control the trajectory of the moving object and the position of the moving object, respectively,
   wherein the error quaternion of the moving object is extracted from a quaternion indicating a trajectory of a current point of the moving object and a quaternion indicating a trajectory of a target point of the moving object,
   wherein an error quaternion ($q_e$) of the moving object is obtained by the following equation:

$$q_e = q_t^* \circ q$$

where $q_t^*$ is a conjugate of the quaternion $q_t$ indicating the trajectory of the target point, and q is the quaternion indicating the trajectory of the current point.

7. The method of claim 6, wherein the controlling of a position of the moving object comprises further using a difference between a position of the target point of the moving object and a position of the current point of the moving object to control the position of the moving object.

8. The method of claim 7, wherein the controlling of a position of the moving object comprises controlling the position of the moving object by the following equation:

$$q_e' = \tfrac{1}{2}(p_e \circ q_e)$$

where $p_e$ is the difference between the position ($p_t$) of the target point of the moving object and the position (p) of the current point of the moving object.

9. The method of claim 8, further comprising updating the trajectory of the current point of the moving object and the position of the current point of the moving object.

10. The method of claim 9, wherein the updating comprises updating the trajectory of the current point of the moving object and the position of the current point of the moving object by integrating a result of the following equation:

$$\hat{\dot{p}} = \tfrac{1}{2}\hat{q}_e \circ \hat{\omega}$$

where $\hat{\omega} = [u_T{:}0] + \varepsilon[u_F{:}0]$, $\hat{q}_e = q_e + \varepsilon q_e'$, $u_T$ is a torque for controlling the trajectory of the moving object, and $u_F$ is a force for controlling the position of the moving object.

11. A computer-readable recording medium having a program for executing a method of controlling a moving object stored therein, the method comprising:
   controlling a trajectory of the moving object; and
   controlling a position of the moving object,
   wherein the controlling of a trajectory of the moving object and the controlling of a position of the moving object comprise using an error quaternion of the moving object to control the trajectory of the moving object and the position of the moving object, respectively,
   wherein the error quaternion of the moving object is extracted from a quaternion indicating a trajectory of a current point of the moving object and a quaternion indicating a trajectory of a target point of the moving object,
   wherein an error quaternion ($q_e$) of the moving object is obtained by the following equation:

$$q_e = q_t^* \circ q$$

where $q_t^*$ is a conjugate of the quaternion $q_t$ indicating the trajectory of the target point, and q is the quaternion indicating the trajectory of the current point.

* * * * *